United States Patent
Zois

(10) Patent No.: US 12,460,554 B2
(45) Date of Patent: Nov. 4, 2025

(54) FULLY STABILIZED ZIRCONIA IN A SEAL SYSTEM

(71) Applicant: Siemens Energy Global GmbH & Co. KG, Bayern (DE)

(72) Inventor: Dimitrios Zois, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/437,551

(22) PCT Filed: Feb. 25, 2020

(86) PCT No.: PCT/EP2020/054898
§ 371 (c)(1),
(2) Date: Sep. 9, 2021

(87) PCT Pub. No.: WO2020/193043
PCT Pub. Date: Oct. 1, 2020

(65) Prior Publication Data
US 2022/0154592 A1    May 19, 2022

(30) Foreign Application Priority Data

Mar. 22, 2019 (EP) .................................... 19164597

(51) Int. Cl.
*F01D 11/12* (2006.01)
*F01D 5/28* (2006.01)
(Continued)

(52) U.S. Cl.
CPC ............ *F01D 11/122* (2013.01); *F01D 5/284* (2013.01); *F01D 5/288* (2013.01); *F01D 11/08* (2013.01);
(Continued)

(58) Field of Classification Search
CPC .......... F01D 5/284; F01D 5/288; F01D 11/12; F01D 11/122; F01D 25/005;
(Continued)

(56) References Cited

U.S. PATENT DOCUMENTS

| | | | |
|---|---|---|---|
| RE26,869 E | * | 4/1970 | Wahl ....................... B01F 23/53 241/21 |
| 5,705,231 A | | 1/1998 | Nissley et al. |

(Continued)

FOREIGN PATENT DOCUMENTS

| | | |
|---|---|---|
| CN | 1689800 A | 11/2005 |
| CN | 103874580 A | 6/2014 |

(Continued)

OTHER PUBLICATIONS

PCT International Search Report and Written Opinion of International Searching Authority mailed May 8, 2020 corresponding to PCT International Application No. PCT/EP2020/054898 filed Feb. 25, 2020.

*Primary Examiner* — Nathaniel E Wiehe
*Assistant Examiner* — Art Golik
(74) *Attorney, Agent, or Firm* — Wolter Van Dyke Davis, PLLC

(57) ABSTRACT

A seal system for gas turbine that includes a stator and a blade with a blade tip facing the stator. The blade has a protective ceramic coating having an inner ceramic layer being made of a partially stabilized zirconia and having at least a partially segmented microstructure in form of vertical cracks. The ceramic coating further includes an outer ceramic layer made of fully stabilized zirconia and having a segmented microstructure. Advantageously, the entire airfoil surface is provided with the protective ceramic coating. With the fully stabilized zirconia coating on the tip of a blade which faces a casing with a ceramic coating, a result is a better sealing system. The stator includes an abradable (Continued)

coating having at least an outer ceramic coating being made of fully stabilized or ytterbium stabilized zirconia.

9 Claims, 1 Drawing Sheet

(51) Int. Cl.
*F01D 11/08* (2006.01)
*F01D 25/00* (2006.01)

(52) U.S. Cl.
CPC ............ *F01D 11/12* (2013.01); *F01D 25/005* (2013.01); *F05D 2300/21* (2013.01); *F05D 2300/2118* (2013.01); *F05D 2300/514* (2013.01); *F05D 2300/6033* (2013.01)

(58) Field of Classification Search
CPC ......... F05D 2300/21; F05D 2300/2118; F05D 2300/6033; F05D 2300/514
See application file for complete search history.

(56) References Cited

U.S. PATENT DOCUMENTS

| | | | |
|---|---|---|---|
| 6,102,656 A | 8/2000 | Nissley | |
| 6,358,002 B1 | 3/2002 | Good | |
| 8,685,545 B2 | 4/2014 | Allen | |
| 2002/0197155 A1 | 12/2002 | Howard | |
| 2005/0170200 A1* | 8/2005 | Nagaraj | C23C 28/3215 428/629 |
| 2005/0244663 A1 | 11/2005 | Ulion | |
| 2006/0166019 A1* | 7/2006 | Spitsberg | C04B 41/52 428/471 |
| 2011/0171010 A1 | 7/2011 | Li | |
| 2014/0220378 A1 | 8/2014 | Nagaraj | |
| 2014/0261080 A1* | 9/2014 | Lee | C23C 14/30 427/596 |
| 2014/0315006 A1* | 10/2014 | Stamm | C23C 28/345 428/312.8 |
| 2016/0251971 A1* | 9/2016 | Düsterhöft | C23C 28/3455 428/213 |
| 2018/0179645 A1 | 6/2018 | Flores Renteria | |
| 2019/0024510 A1* | 1/2019 | Hazel | C23C 4/129 |
| 2020/0123911 A1* | 4/2020 | Ladru | C23C 28/3215 |

FOREIGN PATENT DOCUMENTS

| | | |
|---|---|---|
| CN | 104487612 A | 4/2015 |
| DE | 102011081323 B3 | 6/2012 |
| DE | 102017207238 A1 | 10/2018 |
| EP | 2865781 A1 | 4/2015 |
| EP | 3106541 A1 | 12/2016 |
| JP | H09133006 A | 5/1997 |
| JP | 2001348655 A | 12/2001 |
| JP | 2002069607 A | 3/2002 |
| JP | 2010242223 A | 10/2010 |
| KR | 20000006199 A * | 1/2000 |
| SG | 72959 A1 | 5/2000 |

* cited by examiner

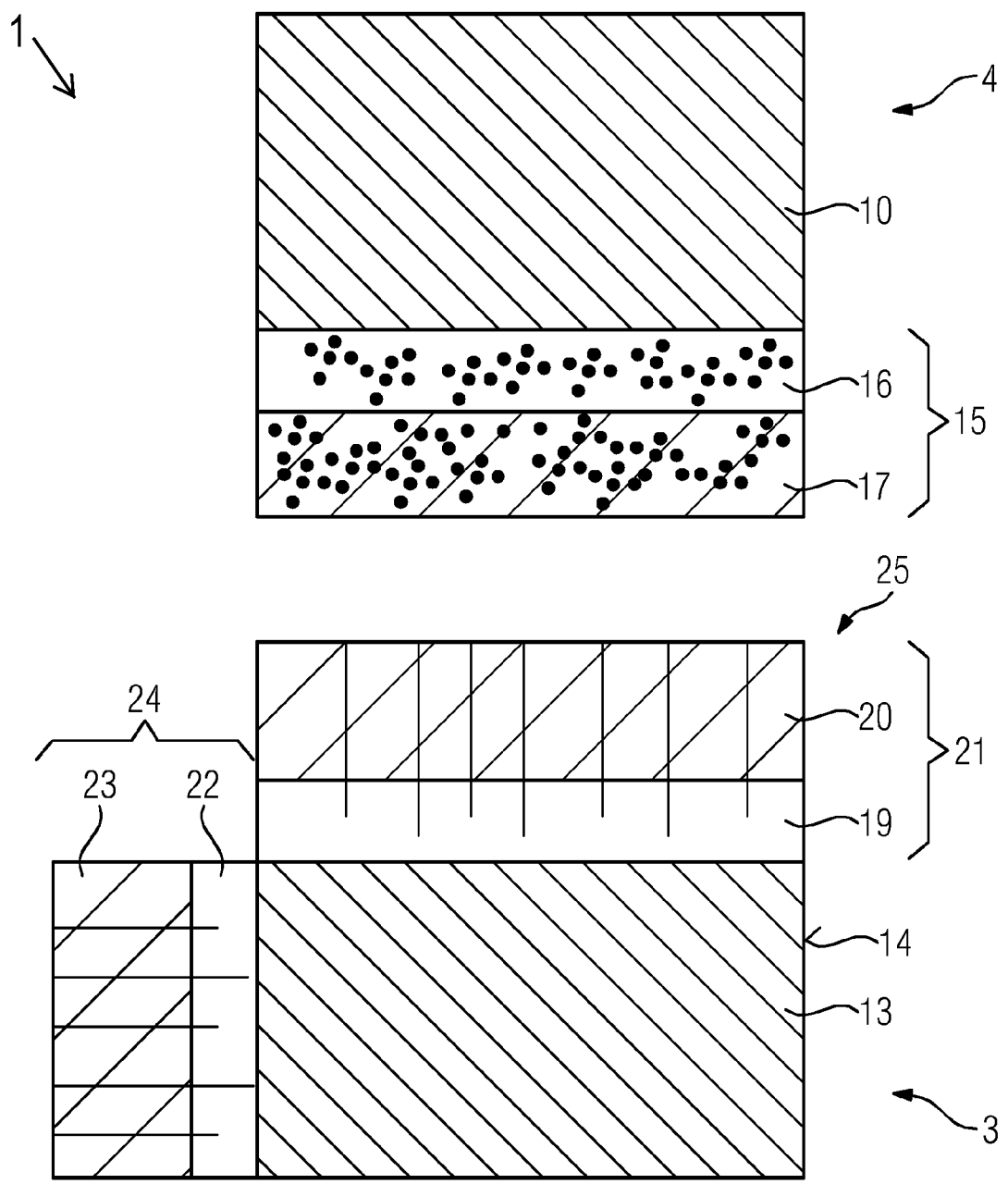

FULLY STABILIZED ZIRCONIA IN A SEAL SYSTEM

CROSS REFERENCE TO RELATED APPLICATIONS

This application is the US National Stage of International Application No. PCT/EP2020/054898 filed 25 Feb. 2020, and claims the benefit thereof. The International Application claims the benefit of European Application No. EP19164597 filed 22 Mar. 2019. All of the applications are incorporated by reference herein in their entirety.

FIELD OF INVENTION

The invention relates to a fully stabilized Zirconia based on a tip on a plate which acts as an abrasive in a seal system.

BACKGROUND OF INVENTION

The currently used abradable coatings in the turbine sections are high porosity ceramics (over 25%). Specifically, typical abradable coatings used currently in the modern Large Gas Turbines (LGTs) are the YBZO (Ytterbia stabilized Zirconia) coatings. A polyester as a fugitive is sprayed along with the ceramic powder in order to increase the overall porosity of the coating. High porosity is the most important element of an abradable since it can allow good abradability during the rubbing of the blade tip on it. At the new LGTs, the Turbine Inlet Temperature (TIT) is estimated to be over 1873K. At these temperatures the TBC is considered prime reliant. That means that it is an irreplaceable component of the part. If the ceramic coating is lost, then the exposure of the underneath metal in these temperatures will lead to its quick degradation and the part will have to be exchanged.

In a similar manner, if the blade tips of first row or second row are not coated with TBC, then they will be quickly deteriorated, signifying the importance of a TBC coating on the tip. The TBC coating on the tip should be thick enough in order to protect the underlying metal and should be tough enough not be rubbed away during its contact with the abradable coating on the Ring Segments.

Up to date the typical TBC tip coating used is the YSZ (Yttria Stabilized Zirconia), but this coating lacks the properties to survive higher temperatures. New chemistries of TBCs have been developed to address the higher temperatures seen in the latest generations of IGTs. The new chemistries, known as Fully Stabilized Zirconia (FSZ) coatings, combine higher chemical phase stability and better sintering resistance compared to the standard 8YSZ coating. The adversity of the new chemistries is that however they present also much lower toughness. That means that they can be relatively easily rubbed away against a counterbody such as an abradable coating.

SUMMARY OF INVENTION

It is therefore aim of the invention to overcome the problems mentioned above.

The problem is solved by a seal system according to the independent claim.

Further advantages are listed in the dependent claims which can be combined arbitrarily with each other to yield further advantages.

What is suggested is to deposit a FSZ with a microstructure that will maximize its toughness. This microstructure is segmented. The coating is deposited so dense that vertical cracks are formed in it. It is well documented that the segmented microstructure combines good thermal strain capability along with significantly improved toughness and erosion resistance compared to porous coatings of the same chemistry. It has been shown that the toughness of the segmented microstructure of a FSZ coating is more than 3X higher compared to the toughness of a 15% porous FSZ.

The novelty of the present invention lies on making possible to use a FSZ coating on the tip of the blades as an abrasive coating. The significantly improved toughness of the segmented FSZ will ensure that the abradable will be rubbed away and not the opposite.

The advantages of the present invention are:

A high temperature stable coating, with an inherited low toughness, can be deposited with a microstructure that can increase significantly its toughness and its rubbing capability.

BRIEF DESCRIPTION OF THE DRAWINGS

The FIG. shows an arrangement of a seal system 1.

DETAILED DESCRIPTION OF INVENTION

The FIG. and the description show only one or several examples of the invention.

The seal system 1 comprises a casing 4 or a stator 4.

The stator 4 or the casing 4 has advantageously a substrate 10, which is especially metallic, on which advantageously first inner ceramic coating 16 is applied on. Preferably this first inner ceramic coating 16 is a porous PSZ (partially stabilized zirconia) coating with preferable a porosity of at least 15% and maximum 35%.

On top of the first inner ceramic coating 16 a first outer ceramic coating 17 is applied, which can be YBZO ($Yb_2O_3$ stabilized Zirconia) or a fully stabilized Zirconia (FSZ), both having a porosity advantageously between 25%-40%.

Both form the first ceramic coating 15.

The other part of the seal system 1 is a blade 3, wherein here only the tip 25 is shown. The blade 3 has on the tip 25 second inner ceramic coating 19 which comprises a Partially Stabilized Zirconia (PSZ) coating of a segmented microstructure and is advantageously at least 125 µm thick.

On top of this PSZ coating 19, a second outer ceramic coating 20 is applied, which is segmented and similarly of the segmented microstructure and of Fully Stabilized Zirconia (FSZ) chemistry.

Both form the second ceramic coating 21.

The blade 3 comprises especially a metallic substrate 13 which is especially a nickel or cobalt based superalloy, but which can also be any CMC or any ceramic material.

For all coatings 15, 21, 24 on the substrate 10, 13 of the casing or on the blade 3 there can be any bond coat especially metallic coat (NiCoCrAlY, . . . ) between the substrates 10, 13 and the ceramic coatings 16, 19, 22 which are not shown here.

The blade 3 has on its airfoil 14 also a ceramic airfoil coating 24.

This ceramic airfoil coating 24; 22, 23 on the airfoil 14 can have ideally the same composition and micro structure as the ceramic coating on the tip 25, meaning a segmented FSZ on top of a PSZ with an inner ceramic airfoil coating 22 and an outer ceramic airfoil coating 23.

But it can also be different in the microstructure but advantageously not in the composition.

The invention claimed is:

1. A seal system, comprising:
a casing, and
a blade,
wherein the casing comprises a first ceramic coating, which faces a tip of the blade, wherein the first ceramic coating comprises: a first inner ceramic coating that is applied directly to the casing and that is made of Partially Stabilized Zirconia (PSZ); and a first outer ceramic coating that is an outermost layer, that is applied directly to the first inner ceramic coating and that is made of Fully Stabilized Zirconia (FSZ) or Ytterbia stabilized Zirconia (YBZO),
wherein the blade, which faces the casing or the first ceramic coating of the casing, comprises on the tip of the blade a second ceramic coating comprising: a second inner ceramic coating comprising an at least partially segmented microstructure and a minimum thickness of 125 μm made of PSZ, and a second outer ceramic coating comprising a segmented microstructure made of FSZ,
wherein the first outer ceramic coating comprises a greater porosity than the first inner ceramic coating, and
wherein the second ceramic coating is an abrasive coating configured to act as a seal between the blade and the casing, and wherein the first ceramic coating is an abradable coating configured to be abraded by the second ceramic coating.

2. The seal system according to claim 1,
wherein a ceramic airfoil coating is present on an airfoil of the blade, which comprises an inner ceramic airfoil coating made of PSZ and an outer ceramic airfoil coating made of FSZ is on the airfoil of the blade, and
wherein a microstructure of the ceramic airfoil coating comprises a different microstructure than that of the second ceramic coating.

3. The seal system according to claim 2,
wherein the ceramic airfoil coating consists of a segmented microstructure.

4. The seal system according to claim 1,
wherein the second ceramic coating consists of a segmented microstructure.

5. The seal system according to claim 1,
wherein the first inner ceramic coating does not consist of a segmented microstructure.

6. The seal system according to claim 1,
wherein the first inner ceramic coating made of PSZ has a porosity of at least 15% and maximum 35%.

7. The seal system according to claim 1,
wherein the first outer ceramic coating made of FSZ or YBZO has a porosity of 25% to 40%.

8. The seal system according to claim 1,
wherein the first outer ceramic coating is made of the Ytterbia stabilized Zirconia (YBZO).

9. A seal system, comprising:
a casing, and
a blade,
wherein the casing comprises a first ceramic coating, which faces a tip of the blade, wherein the first ceramic coating comprises: a first inner ceramic coating that is applied directly to the casing and that is made of Partially Stabilized Zirconia (PSZ); and a first outer ceramic coating that is an outermost layer, that is applied directly to the first inner ceramic coating and that is made of Fully Stabilized Zirconia (FSZ) or Ytterbia stabilized Zirconia (YBZO),
wherein the blade, which faces the casing or the first ceramic coating of the casing, comprises on the tip of the blade a second ceramic coating comprising: a second inner ceramic coating comprising an at least partially segmented microstructure and a minimum thickness of 125 μm made of PSZ, and a second outer ceramic coating comprising a segmented microstructure made of FSZ,
wherein the second ceramic coating is an abrasive coating configured to act as a seal between the blade and the casing, and wherein the first ceramic coating is an abradable coating configured to be abraded by the second ceramic coating,
wherein a ceramic airfoil coating is present on an airfoil of the blade, which comprises an inner ceramic airfoil coating made of PSZ and an outer ceramic airfoil coating made of FSZ is on the airfoil of the blade,
wherein a microstructure of the ceramic airfoil coating comprises a different microstructure than that of the second ceramic coating,
wherein the first inner ceramic coating does not consist of a segmented microstructure,
wherein the first outer ceramic coating comprises a greater porosity than the first inner ceramic coating,
wherein the first inner ceramic coating made of PSZ has a porosity of at least 15% and maximum 35%, and
wherein the first outer ceramic coating made of FSZ or YBZO has a porosity of 25% to 40%.

* * * * *